United States Patent [19]

Hutchins

[11] 4,095,635
[45] Jun. 20, 1978

[54] COPING SAW WITH IMPROVED BLADE RETENTION MEANS

[75] Inventor: Walter J. Hutchins, West Hartford, Conn.

[73] Assignee: The Stanley Works, New Britain, Conn.

[21] Appl. No.: 731,733

[22] Filed: Oct. 12, 1976

[51] Int. Cl.² ............................................. B27B 21/00
[52] U.S. Cl. ................................. 145/33 D; 145/33 A
[58] Field of Search .............. 145/33 R, 33 A, 33 AB, 145/33 C, 33 D, 33 E, 34 R, 35 E

[56] References Cited

U.S. PATENT DOCUMENTS

| | | | |
|---|---|---|---|
| 747,735 | 12/1903 | Lawrence | 145/33 C |
| 766,077 | 7/1904 | Tilden | 145/33 A |
| 1,078,599 | 11/1913 | Garman | 145/33 R |
| 1,665,317 | 4/1928 | Maxson | 145/33 D |
| 1,993,608 | 3/1935 | Kelley | 145/33 D |
| 2,335,141 | 11/1943 | Blum | 145/33 A |
| 2,514,609 | 7/1950 | Roy | 145/33 R |
| 2,795,251 | 6/1957 | Oleksy | 145/33 R |

FOREIGN PATENT DOCUMENTS

| | | | |
|---|---|---|---|
| 752,384 | 7/1933 | France | 145/33 R |
| 212,365 | 3/1924 | United Kingdom | 145/33 A |

Primary Examiner—James L. Jones, Jr.
Assistant Examiner—J. T. Zatarga

[57] ABSTRACT

A coping saw of the type having a generally U-shaped frame with a pair of spaced legs has mounted thereon adjacent the free ends of the legs elongated anchor bolts with axially extending slots at their opposed ends to receive the end portions of the saw blade. Each of the anchor bolts has a generally L-shaped notch intersecting the axial slot and providing a sloping leg portion which extends from the periphery towards the opposite leg of the frame and an axial leg portion which extends from the inner end of the sloping leg portion towards the adjacent leg. The transversely extending pins on the saw blade seat in the sloping leg portions of the notches until deflection of the frame occurs. When such deflection occurs, the pins are cammed into the axial leg portions of the notches.

7 Claims, 5 Drawing Figures

COPING SAW WITH IMPROVED BLADE RETENTION MEANS

BACKGROUND OF THE INVENTION

Coping saws are widely employed for various applications and generally comprise a U-shaped metal frame supporting anchor bolts in which are mounted the ends of the coping saw blade. In accordance with conventional practice, the saw blade has transversely extending pins adjacent the ends thereof, and these pins seat in notches in the anchor bolts which intersect axial slots receiving the end portions of the blade. Indicative of the types of anchor bolt structures which have been employed is that illustration in Roy U.S. Pat. No. 2,514,609.

Since the coping saws generally employ a U-shaped frame which is bent from metal bar stock or tubing and since the free ends of the frame are under considerable tension when the blade is tightly secured in position, impacts upon the frame which may inadvertently occur during usage frequently cause the free ends to deflect towards each other and spring the saw blade outwardly therefrom. The sloping notches of the type illustrated in the above mentioned Roy patent tend to facilitate camming of the blade pins outwardly therefrom.

It is an object of the present invention to provide a saw with an improved saw blade holder which will tend to retain the mounting pins of the saw blade within the mounting bolts when frame deflecting forces occur.

It is also an object to provide such a saw wherein the anchor bolts may be readily fabricated with slots and notches cooperating to secure firmly the ends of the saw blade within the frame and to resist forces tending to effect disengagement of the saw blade therefrom.

Another object is to provide such a saw which may be simply and readily fabricated and which is rugged in construction for long lived operation.

SUMMARY OF THE INVENTION

It has now been found that the foregoing and related objects are readily attained in a saw which comprises a holder including a generally U-shaped frame having a pair of spaced legs, a handle secured adjacent the free end of one leg of the frame, and a pair of elongated anchor bolts supported adjacent the free ends of the frame and having blade mounting portions extending inwardly of the legs and towards each other. Each of the blade mounting portions has a slot extending axially from the inner end thereof and a generally L-shaped notch intersecting the axial slot with a sloping leg portion sloping from the periphery thereof towards the opposite leg of the frame and an axial leg portion extending from the inner end of the sloping leg portion towards the adjacent leg. A saw blade has its end portions disposed within the axial slots of the anchor bolts and has transversely extending pins on its end portions seated within the notches. Deflection of the legs of the frame results in camming of the pins into the axial leg portions of the notches.

In the preferred embodiment, the legs of the frame have generally circular apertures adjacent the free ends threof, and the anchor bolts are of generally circular cross section and rotatably seated in the circular apertures of the frame. The L-shaped notch is configured to provide a shoulder at the intersection between the sloping leg and axial leg portions, and this shoulder is oppositely angularly disposed relative to the angle of said sloping leg portion to facilitate camming of the transversely extending pins of the saw blade into the axial leg portions of the notches.

Desirably, the slot is of a depth equal to about ⅓-⅔ the width or diameter of the anchor bolts, and the notches are of a depth equal to about ⅓-⅔ the depth of the axial slots. The included angle between the sloping leg and axial leg portions of the notches is about 55°-80°.

BRIEF DESCRIPTION OF THE ILLUSTRATED EMBODIMENT

DETAILED DESCRIPTION OF THE ILLUSTRATED EMBODIMENT

Figure 1:
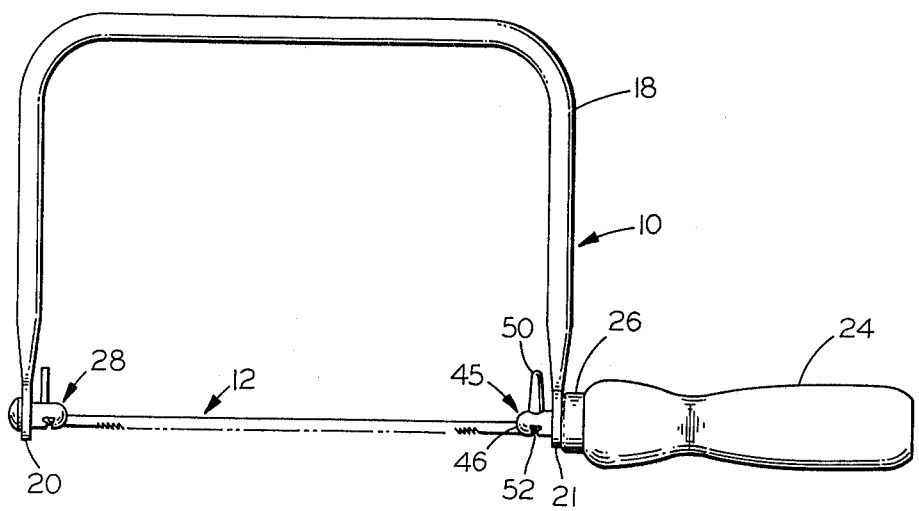
FIG. 1 is a side elevational view of a coping saw embodying the present invention.

Turning now in detail to FIG. 1 of the attached drawings, a coping saw embodying the present invention comprises a blade holder generally designated by the numeral 10 and a blade generally designated by the numeral 12 and having teeth 14 along one edge thereof and transversely extending mounting pins 16 at the end portions thereof.

The holder 10 has a generally U-shaped metal frame 18 with flattened free end portions 20, 21 having apertures 22 (seen in FIG. 2) and an elongated handle 24 extending outwardly from one end portion 21 with a ferrule 26 at the inner end thereof.

As seen in FIGS. 2-5, there is seated in the aperture 22 of the end portion 20 the anchor bolt generally designated by the numeral 28 having a generally hemispherical head 30 and an elongated shank 32 of circular cross section. Extending axially in the shank 32 from its inner end is a slot 33 which is intersected by a generally L-shaped notch having a sloping portion 34 which slopes towards the inner end of the bolt 28 and an axially extending portion 36. A shoulder 38 slopes from the sloping slot portion 34 to the axial portion 36 in the direction opposite to that of the principal direction of the sloping slot portion 34.

Seated in the radial aperture 41 in the shank 32 is a pin 40 for rotating the anchor bolt 28 in the aperture 22. The underside of the head 30 is provided with a multiplicity of radially extending ribs 42 which seat in complementary recesses 44 in the outer surface of the outer end portion 20 to lock the anchor bolt 28 in a rotated position.

The other anchor bolt is generally designated by the numeral 45 and has a head 46 of generally circular cross section and a threaded shank (not shown) which extends through the aperture 22 (not shown) in the end portion 21 and ferrule 26 and threadably engages in the handle 24. A pin 50 extends radially outwardly therefrom for effecting rotation and a slot (not shown) and generally L-shaped notch 52 are provided in the same configuration and relationship as those in the bolt 28.

Figure 2:
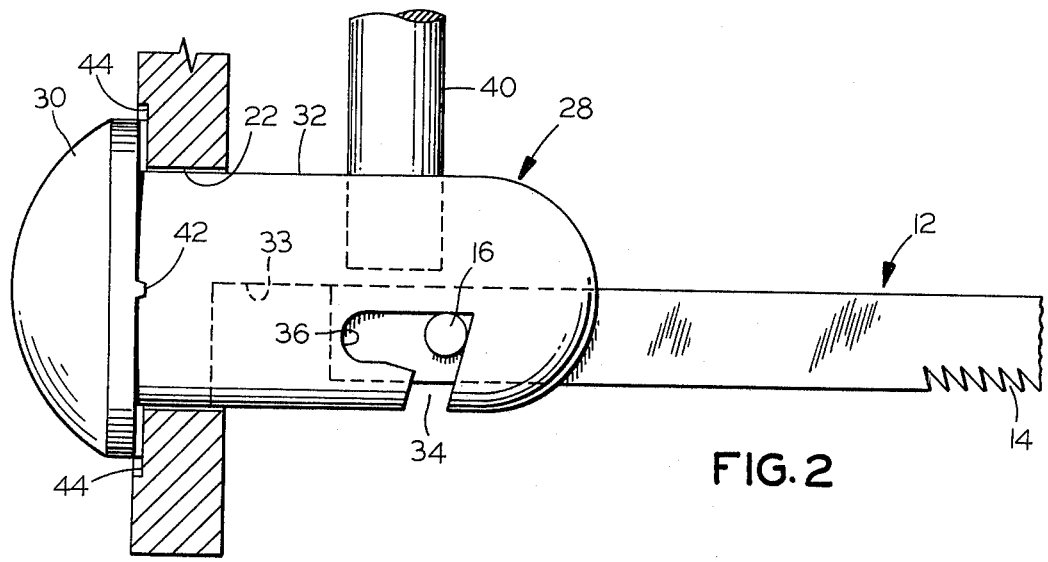
FIG. 2 is a fragmentary side elevational view to a greatly enlarged scale of the end portion of the saw remote from the handle with the frame in section and with various structural portions shown in dotted line.

As can be seen in FIG. 2, the end portions of the saw blade 12 seat in the axial slots 33 of the anchor bolts 28, 45 and the pins 16 thereof are disposed in the sloping portions 34 of the notches in the anchor bolts 28, 45. The anchor bolt 45 is drawn tightly into the handle 24 by rotation of the handle 24 until the saw blade 12 is tensioned between the anchor bolts 28, 45. As can be seen, the axially extending portion 36 is of greater width and length than the diameter of the pin 16.

Figure 3:
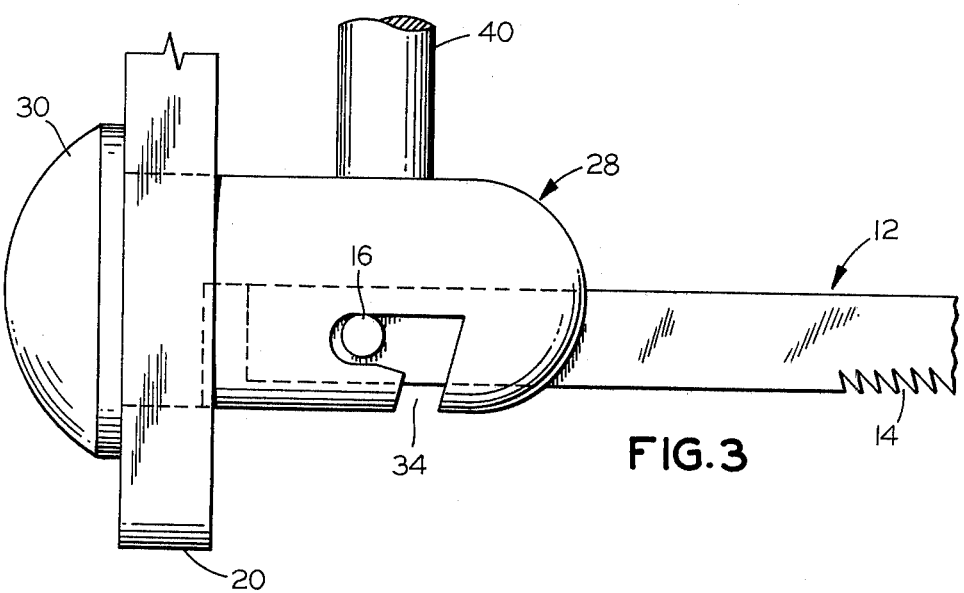
FIG. 3 is a view similar to FIG. 2 showing the mounting pins on the saw blade disposed within the axial portion of the notch following deflection of the frame.
Figure 4:
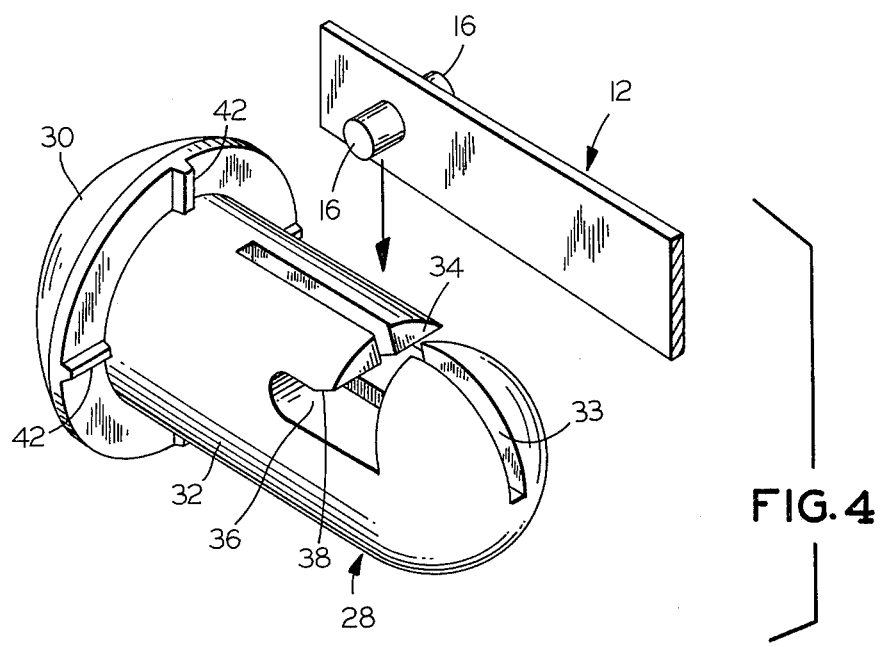
FIG. 4 is a fragmentary exploded perspective view of the anchor bolt and saw blade.
Figure 5:
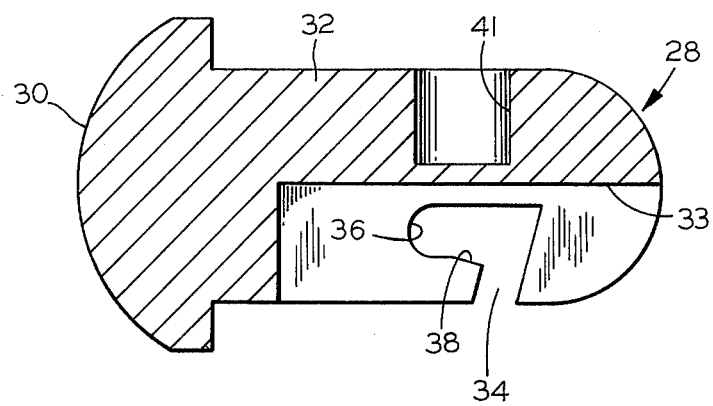
FIG. 5 is a sectional view of the anchor bolt of FIGS. 2-4.

In the course of utilization of the coping saw, it may be inadvertently dropped and the impact on the frame 18 may tend to spring the end portions 20, 21 towards each other. The stiffness of the saw blade 12 will produce a camming action of the pins 16 into the axial portions of the L-shaped notches 52 to maintain the blade 12 therewithin as seen in FIG. 3, rather than springing outwardly therefrom. Moreover, the same action takes place when the blade 12 jams and the saw is pushed to free it with attendant springing of the frame. As will be appreciated, the oppositely sloping shoulders 38 in the notches 52 facilitate this camming action.

Although the frame has been illustrated as fabricated of metal bar stock of generally cylindrical cross section with flattened end portions, it will be appreciated that other materials and configurations may be employed. For example, tubular stock may be provided with flattened end portions or stock of generally circular cross section may be welded or otherwise affixed thereto end portions providing suitable means for retaining the anchor bolts thereon. In addition to metal stock, reinforced plastics may conveniently be employed as the frame material.

In the illustrated embodiment, the handle and one anchor bolt cooperate to effect mounting thereof upon the adjacent leg of the frame. However, other arrangements may be employed for mounting both the anchor bolt and the handle upon the frame as is well known in the art. The illustrated embodiment offers the advantage of providing a convenient means for rapidly tensioning the saw blade between the anchor bolts.

The axial slots in the anchor bolts should extend to a depth between ⅓ and ⅔ of the total thickness of the anchor bolts; preferably, the depth is approximately ½ the thickness or diameter. The L-shaped notches must, of course, intersect the axial slots and should extend to a depth equal to about ¼ to ¾ of the depth of the axial slots. The included angle between the sloping and axial leg portions of the notches should be within the range of 55° to 80°.

From the foregoing detailed specification and drawings, it will be readily appreciated that the saw of the present invention affords significant advantages in ensuring retention of the saw blade within the anchor bolts during the minor impacts to which the frame will be exposed during usage. The components of the saw may be readily and economically fabricated from materials which will provide a rugged and long lasting structure.

Having thus described the invention, I claim:

1. A saw comprising:
   A. a holder including
      1. a generally U-shaped frame having a pair of spaced legs;
      2. a handle secured adjacent the free end of one leg of said frame;
      3. a pair of elongated anchor bolts supported adjacent the free ends of said frame and having blade mounting portions extending inwardly of said legs and towards each other, each of said blade mounting portions having a slot extending axially from the inner end thereof and a generally L-shaped notch intersecting said axial slot with a sloping leg portion sloping from the periphery thereof towards the opposite leg of said frame and an axial leg portion extending from the inner end of the sloping leg portion towards the adjacent leg; and
   B. a saw blade having end portions disposed within said axial slots of said anchor bolts and having transversely extending pins on said end portions seated within said notches at the inner end of said sloping leg portions thereof, said axial leg portions of said L-shaped notches being substantially greater in width and length than the diameter of said pins, deflection of said legs of said frame resulting in camming of said pins into said axial leg portions of said notches.

2. The saw in accordance with claim 1 wherein the included angle between said sloping leg and axial leg portions of said notches is about 55°-80°.

3. A saw comprising:
   A. a holder including
      1. a generally U-shaped frame having a pair of spaced legs;
      2. a handle secured adjacent the free end of one leg of said frame;
      3. a pair of elongated anchor bolts supported adjacent the free ends of said frame and having blade mounting portions extending inwardly of said legs and towards each other, each of said blade mounting portions having a slot extending axially from the inner end thereof and a generally L-shaped notch intersecting said axial slot with a sloping leg portion sloping from the periphery thereof towards the opposite leg of said frame and an axial leg portion extending from the inner end of the sloping leg portion towards the adjacent leg, said L-shaped notch being configured to provide a shoulder at the intersection between said sloping leg and axial leg portions which is oppositely angularly disposed relative to the angle of said sloping leg portion; and
   B. a saw blade having end portions disposed within said axial slots of said anchor bolts and having transversely extending pins on said end portions seated within said notches, deflection of said legs of said frame resulting in camming of said pins into said axial leg portions of said notches, said shoulder of said L-shaped notch facilitating camming of said transversely extending pins of said saw blade into said axial leg portions of said notches.

4. The saw in accordance with claim 3 wherein said legs of said frame have generally circular apertures adjacent the free ends thereof and wherein said anchor bolts are of generally circular cross section and rotatably seated in said circular apertures of said frame.

5. The saw in accordance with claim 3 wherein said slot is of a depth equal to about ⅓-⅔ the width of said anchor bolts and wherein said notches are of a depth equal to about ¼-¾ the depth of said axial slots.

6. The saw in accordance with claim 3 wherein the included angle between said sloping leg and axial leg portions of said notches is about 55°-80°.

7. A saw comprising:
   A. a holder including 1. a generally U-shaped frame having a pair of spaced legs;
2. a handle secured adjacent the free end of one leg of said frame;
3. a pair of elongated anchor bolts supported adjacent the free ends of said frame and having blade mounting portions extending inwardly of said legs and towards each other, each of said blade mounting portions having a slot extending axially from the inner end thereof and a generally L-shaped notch intersecting said axial slot with a sloping leg portion sloping from the periphery thereof towards the opposite leg of said frame and an axial leg portion extending from the inner end of the sloping leg portion towards the adjacent leg, said L-shaped notch being configured to provide a shoulder at the intersection between said sloping leg and axial leg portions which is oppositely annularly disposed relative to the angle of said sloping leg portion; and B. a saw blade having end portions disposed within said axial slots of said anchor bolts and having transversely extending pins on said end portions seated within said notches at the inner end of said sloping leg portions thereof, said axial leg portions of said L-shaped notches being substantially greater in width and length than the diameter of said pins, deflection of said legs of said frame resulting in camming of said pins into said axial leg portions of said notches, said shoulder of said L-shaped notch facilitating camming of said transversely extending pins of said saw blade into said axial leg portions of said notches.

* * * * *